US007386299B2

(12) United States Patent
Nakamura

(10) Patent No.: US 7,386,299 B2
(45) Date of Patent: Jun. 10, 2008

(54) MOBILE COMMUNICATION SYSTEM AND APPARATUS CONSTITUTING SAME

(75) Inventor: Takaharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 15 days.

(21) Appl. No.: 10/646,938

(22) Filed: Aug. 22, 2003

(65) Prior Publication Data

US 2005/0287988 A1    Dec. 29, 2005

Related U.S. Application Data

(63) Continuation of application No. PCT/JP01/01598, filed on Mar. 2, 2001.

(51) Int. Cl.
*H04M 3/16* (2006.01)
(52) U.S. Cl. .................. 455/411; 455/550.1; 455/425; 455/547; 455/422.1; 455/558; 713/171; 380/44
(58) Field of Classification Search ........ 455/410–411, 455/418–420, 456.4, 422.1, 423, 425, 514, 455/517, 558, 69, 522, 571–574; 370/328, 370/338, 311, 318; 713/168–171; 380/270, 380/44, 274
See application file for complete search history.

(56) References Cited

U.S. PATENT DOCUMENTS

| 5,282,250 | A | * | 1/1994 | Dent et al. ................... 380/247 |
| 5,390,252 | A | * | 2/1995 | Suzuki et al. ................ 380/247 |
| 5,544,245 | A | * | 8/1996 | Tsubakiyama ............... 713/171 |
| 5,737,701 | A | * | 4/1998 | Rosenthal et al. ........... 455/411 |
| 5,915,225 | A | * | 6/1999 | Mills .......................... 455/558 |
| 5,996,028 | A | * | 11/1999 | Niimi et al. ................. 455/411 |
| 6,081,704 | A | * | 6/2000 | Oshima ....................... 455/410 |
| 6,321,094 | B1 | * | 11/2001 | Hayashi et al. ............. 455/517 |
| 6,343,213 | B1 | * | 1/2002 | Steer et al. ................. 455/411 |
| 7,039,425 | B1 | * | 5/2006 | Mazawa et al. ......... 455/456.4 |
| 7,215,944 | B2 | * | 5/2007 | Mecca ......................... 455/411 |
| 2001/0053709 | A1 | * | 12/2001 | Terasaka ..................... 455/567 |
| 2002/0057678 | A1 | * | 5/2002 | Jiang et al. ................. 370/353 |
| 2003/0122707 | A1 | * | 7/2003 | Durst et al. ............ 342/357.07 |
| 2004/0087318 | A1 | * | 5/2004 | Lipovski .................. 455/456.4 |

FOREIGN PATENT DOCUMENTS

EP        1 022 922 A1    7/2000

(Continued)

*Primary Examiner*—George Eng
*Assistant Examiner*—Kamran Afshar
(74) *Attorney, Agent, or Firm*—Katten Muchin Rosenman LLP

(57) ABSTRACT

In a mobile communication system for authenticating a communicating party when communication is performed between a mobile terminal and a device on the side of a network, the mobile terminal, upon receiving a request signal requesting operation execution from the network device, sends the network device an authentication request signal in order to determine whether the request signal is a request signal from an authorized network device, and performs an authentication operation. The network device executes an authentication operation based upon the authentication request signal received from the mobile terminal and sends a result of the authentication operation to the mobile terminal. The mobile terminal compares the result of its own authentication operation and the result of the authentication operation sent from the network device and executes an operation that is in accordance with the request signal only if authentication that the network device is an authorized network device is obtained based upon agreement of results.

2 Claims, 14 Drawing Sheets

FOREIGN PATENT DOCUMENTS

| | | |
|---|---|---|
| JP | 3-120995 | 5/1991 |
| JP | 5-327693 | 12/1993 |
| JP | 6-165246 | 6/1994 |
| JP | 6-188828 | 7/1994 |
| JP | 6-195024 | 7/1994 |
| JP | 7-87564 | 3/1995 |
| JP | 7-226732 | 8/1995 |
| JP | 07264671 A * | 10/1995 |
| JP | 2000-41102 | 2/2000 |
| JP | 2000-308134 | 11/2000 |
| JP | 2000-312385 | 11/2000 |
| WO | WO 97/22221 | 6/1997 |

\* cited by examiner

MOBILE COMMUNICATION SYSTEM AND APPARATUS CONSTITUTING SAME

CROSS-REFERENCE TO RELATED APPLICATION

The present application is a continuation of International Application No. PCT/JP01/01598 which was filed on Mar. 2, 2001.

BACKGROUND OF THE INVENTION

This invention relates to a mobile communication system in which a communicating party is authenticated when communication is performed between a mobile terminal and a device on the side of a network, and to an apparatus constituting this system. More particularly, the invention relates to a mobile communication system in which, when a signal requesting execution of a prescribed operation is received from a device on the side of a network, whether the device on the network side is an authorized device is authenticated at a mobile terminal, and to an apparatus constituting this system.

Various authentication methods in mobile communication systems have been proposed. For example, Japanese Patent Application Laid-Open No. 10-336744 discloses an authentication technique whereby the validity of a mobile station that has attempted to place a call is authenticated on the side of the base station. According to this prior art, (A) when a call starts to be originated from a mobile station to a base station, (B) the base-station side transmits to the mobile station a first random number that specifies one code key number among a plurality (N-number) of shared code key numbers. (C) From the first random number received the base-station side, the mobile station identifies one code key number from among a plurality (N-number) of code key numbers and sends the base-station side a second random number representing this code key number. (D) The base-station side compares the code key number identified by the second random number transmitted from the mobile-station side and the code key number specified by the first random number, and the base station verifies that the mobile station that attempted to originate the call is authentic only if the two code key numbers match.

Further, an authentication technique for checking the authenticity of a base station on the side of a mobile station has been disclosed in the specification of U.S. Pat. No. 5,282,250 (Jan. 25, 1994). If a large number of corresponding relationships between a random number issued by an authorized base station at the time of authentication in response to an originated call and results of an authentication operation with which mobile stations respond to this random number are accumulated and copied to an unauthorized terminal, it will be possible to make a telephone call using this unauthorized terminal without being billed. Hence a malicious base station may perform a false authentication operation in order to acquire these corresponding relationships unjustly. The above-cited U.S. Pat. No. is a technique whereby the authenticity of a base station is checked on the side of the mobile station in order to prevent a false authentication operation from being carried out by a malicious base station.

Further, the specification of Japanese Patent Application Laid-Open No. 10-42362 discloses a technique whereby transmission of radio waves from a mobile station is halted in accordance with a request signal from the network side in order to prevent medical equipment and other devices from being adversely affected by emission of radio waves in a hospital or the like. FIG. 14 illustrates an example of prior art in a case where a base station requests the halting of radio-wave emissions from a mobile station. When a mobile station 1 receives a signal (request signal C), which requests the halting of radio-wave transmission, from a base station (not shown), a controller 1$b$ recognizes receipt of the request signal through a receiver (RX) 1$a$. In response, the controller 1$b$ issues a switch (SW) 1$c$ an OFF signal in order to halt transmission. In response to the OFF signal, the switch 1$c$ stops a transmit signal, which is produced by a transmitter (TX) 1$d$, from entering an antenna ATN. Thus, when requested by the base station, the mobile station 1 halts the emission of radio waves regardless of user intentions.

The halting of radio-wave emissions from a mobile station or the provision of internal information of a mobile station based upon a request on the side of the base station regardless of user intentions does not pose a problem so long as the requesting base station is an authorized base station based upon an agreement with the user. If the requesting base station is a malicious base station, however, this does pose a problem because there is the danger that implementation of communication will be obstructed wrongfully or that terminal information concerning the mobile station or personal information set by the user will be used secretly.

SUMMARY OF THE INVENTION

Accordingly, an object of the present invention is to so arrange it that when a request to execute a prescribed operation is received from a device on the side of a network, control is exercised to execute or not execute the operation in accordance with the request upon checking, on the side of the mobile station, whether the request was issued by an authorized device on the network side.

Another object of the present invention is to so arrange it that control for executing an operation is carried out on the side of a mobile station upon distinguishing between a request requiring authentication as to whether a network device that issued the request is an authorized network device, and a request not requiring such authentication.

Another object of the present invention is to so arrange it that implementation of a communication service will not be obstructed wrongfully and so that terminal information concerning a mobile station or personal information set by a user will not be used secretly.

A mobile communication system for authenticating a communicating party when communication is performed between a mobile terminal and a device on the side of a network, wherein (1) the mobile terminal, upon receiving a signal requesting execution of a prescribed operation from the network device, sends the network device an authentication request signal in order to determine whether the operation-execute request signal is a request signal from an authorized network device, and performs an authentication operation; (2) the network device executes an authentication operation based upon the authentication request signal received from the mobile terminal and sends a result of the authentication operation to the mobile terminal; and (3) the mobile terminal compares the result of its authentication operation and the result of the authentication operation sent from the network device and executes an operation that is in accordance with the request signal only if the network device is authenticated as being an authorized network device based upon agreement of results. (4) Further, the mobile terminal determines whether the request is one requiring authentication, executes authentication processing if the request is one requiring authentication, executes an operation that is in accordance with the request if authentication that the base station is an authorized base station is obtained, and foregoes execution of authentication processing and executes the operation that is in accordance with the request if the request is one not requiring authentication.

Authentication processing means of a mobile terminal is divided broadly into (1) authentication processing means which, when a request signal is received from a network device, is for executing authentication processing to check whether the request signal is a request signal from an authorized network device, and (2) means for executing an operation that is in accordance with the request signal only if authentication that the network device is an authorized network device is obtained. Of these, the authentication processing means includes ① means for storing an identifier and key information of a mobile terminal; ② a random-number generator for generating any random number; ③ an authentication operation unit for executing a prescribed authentication operation using the key information and random number; ④ an authentication request signal transmitter for creating an authentication request signal, which includes the terminal identifier and random number, and sending this signal to a network device; ⑤ a receiver for receiving result of an authentication operation obtained by an authentication operation performed by the network device; and ⑥ a comparator for comparing result of the authentication operation performed on the side of the mobile terminal and result of the authentication operation sent from the network device; it being decided that the request is one from an authorized network device when the compared results agree.

The network device includes (1) means for sending a mobile terminal a request signal requesting execution of an operation; (2) a table for storing correspondence between an identifier and key information of a mobile terminal; (3) a receiver for receiving, from a mobile terminal that has received the request signal requesting execution of an operation, an authentication request signal that includes the identifier and random number of this mobile terminal; (4) a key-information acquisition unit for acquiring key information, which corresponds to the received identifier of the mobile terminal, from the table; and (5) an authentication operation unit for executing an authentication operation using the key information acquired from the key-information acquisition unit and the random number included in the authentication request signal received from the mobile terminal, and sending result of the authentication operation to the mobile terminal.

Thus, in accordance with the present invention, when a request to execute a prescribed operation is received from a network device, and control is exercised to execute or not execute the requested operation upon checking, on the side of the mobile station, whether the request was issued by an authorized network device.

Further, in accordance with the present invention, control for executing an operation can be carried out on the side of a mobile station upon distinguishing between a request requiring authentication as to whether a network device that issued the request is an authorized network device, and a request not requiring such authentication.

Further, in accordance with the present invention, it can be so arranged that implementation of a communication service will not be obstructed wrongfully, and terminal information concerning a mobile station or personal information set by a user will not be used secretly, owing to a request from an unauthorized network device.

DESCRIPTION OF THE PREFERRED EMBODIMENTS (A) Principle of the Present Invention

Figure 1:
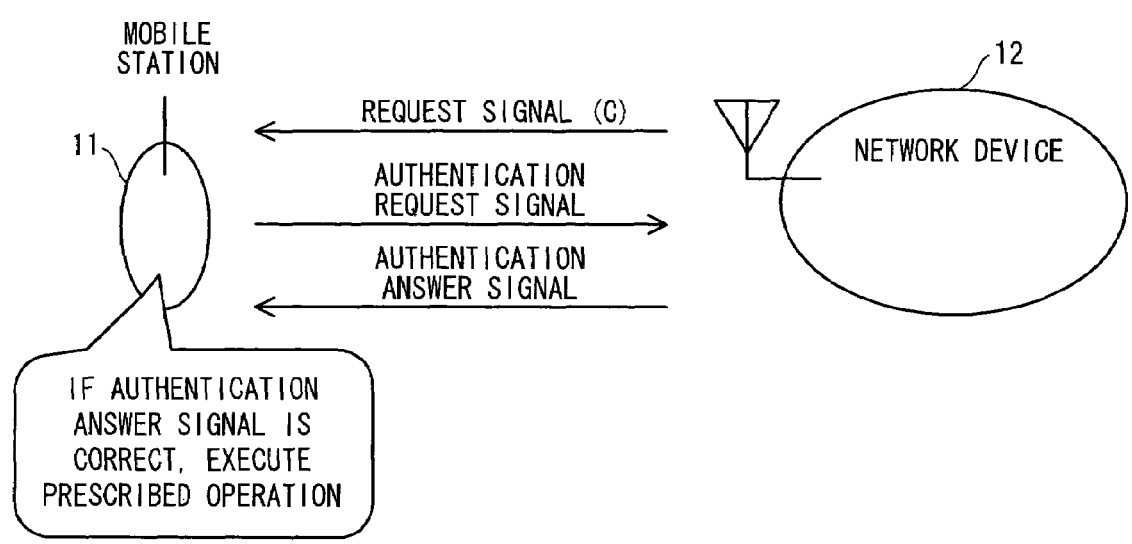
FIG. 1 is a diagram useful in describing the principle of the present invention.

FIG. 1 is a diagram useful in describing the principle of the present invention, in which a mobile station (mobile terminal) 11 and network device 12 communicate with each other via a mobile network. The network device 12 sends the mobile station 11 a signal (request signal C) requesting execution of a prescribed operation, whereupon the mobile station 11 sends an authentication request signal, which is for checking the authenticity of the network device 12, back to the network device. The network device 12 executes an authentication operation based upon the authentication request signal sent back, creates an authentication answer signal (result of authentication operation) and sends the signal to the mobile station 11. The mobile station 11 checks the content of the authentication answer signal (result of the authentication operation), decides that the network device is an authorized network device only if the content of the authentication answer signal authentic information, and executes the operation that is in accordance with the request signal C.

Further, if a request signal requiring authentication as to whether a network device is an authorized network device and a request signal not requiring such authentication exist, the mobile station 11 checks to determine whether the request signal C received from the network device is a request signal requiring authentication. If authentication is required, the mobile station 11 executes authentication processing, executes the operation that is in accordance with the request signal C if authentication that the network device is an authorized network device is obtained, and does not execute the operation that is in accordance with the request signal C if the network device is not an authorized network device. Further, if the request signal C is not one requiring authentication, then the mobile station 11 foregoes authentication processing and executes the operation that is in accordance with the request signal C.

Figure 2:
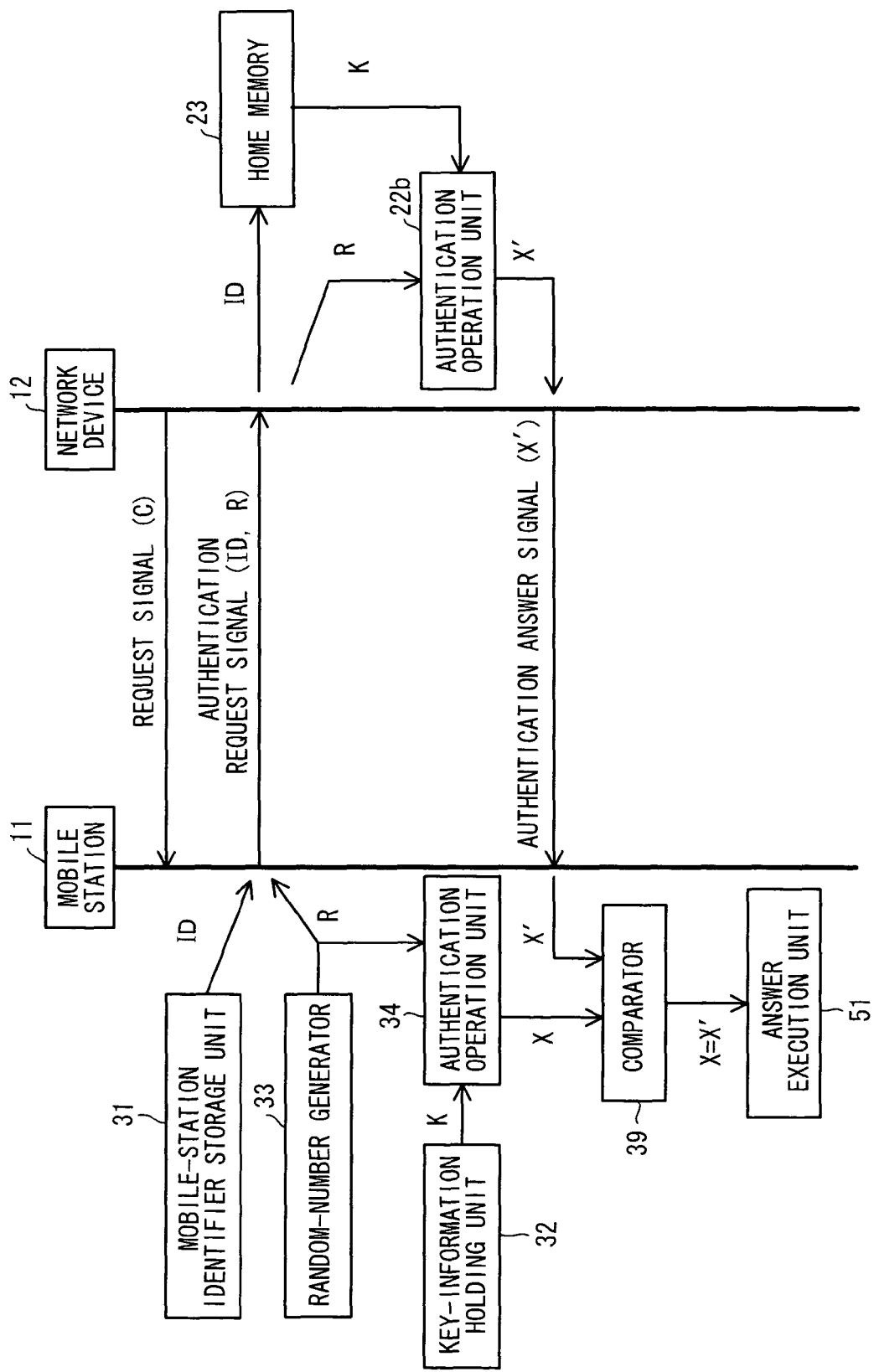
FIG. 2 is a diagram useful in describing an authentication principle in a mobile station and network device.

FIG. 2 is a diagram useful in describing authentication processing in a mobile station and network device.

The network device 12 sends the mobile station 11 a signal (the request signal C) requesting execution of a prescribed operation. Upon receiving the request signal C, the mobile station 11 reads identifier information (ID), which is for identifying itself, out of a mobile-station identifier storage unit 31, and sends the network device 12 an authentication request signal (ID, R) that contains the identifier information (ID) and a random number (R), which has been generated by a random-number generator 33. Further, an authentication operation unit 34 of the mobile station 11 performs an authentication operation using key information (K), which is held in a key-information holding unit 32, and the random number (R), and generates an authentication result (X).

On the other hand, the network device 12 sends the received identifier information (ID) to a home memory 23 whence it obtains key information (K) identical with that being held by the mobile station 11. An authentication operation unit 22b performs an authentication operation similar to that of the authentication operation unit 34 using this key information (K) and the random number (R) received, and generates an authentication result (X'). The network device 12 sends the authentication result (X') to the mobile station 11, and a comparator 39 in the mobile station 11 that has received the authentication result compares the authentication results (X) and (X'). An answer execution unit 51 performs an answer operation in accordance with the request signal C only if the two authentication results agree.

(B) First Embodiment

Figure 3:
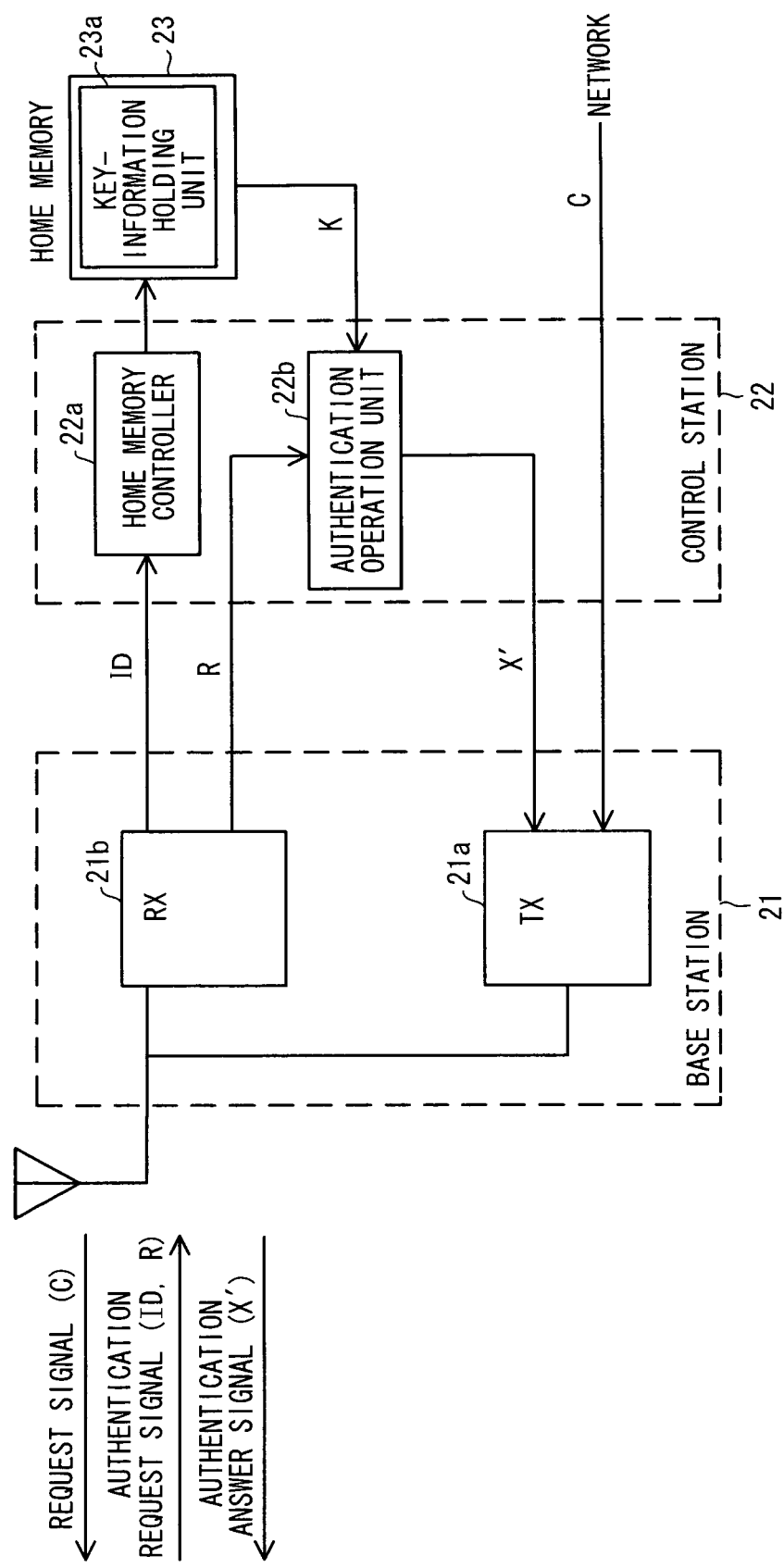
FIG. 3 is a diagram showing the structure of a network device according to a first embodiment.
Figure 4:
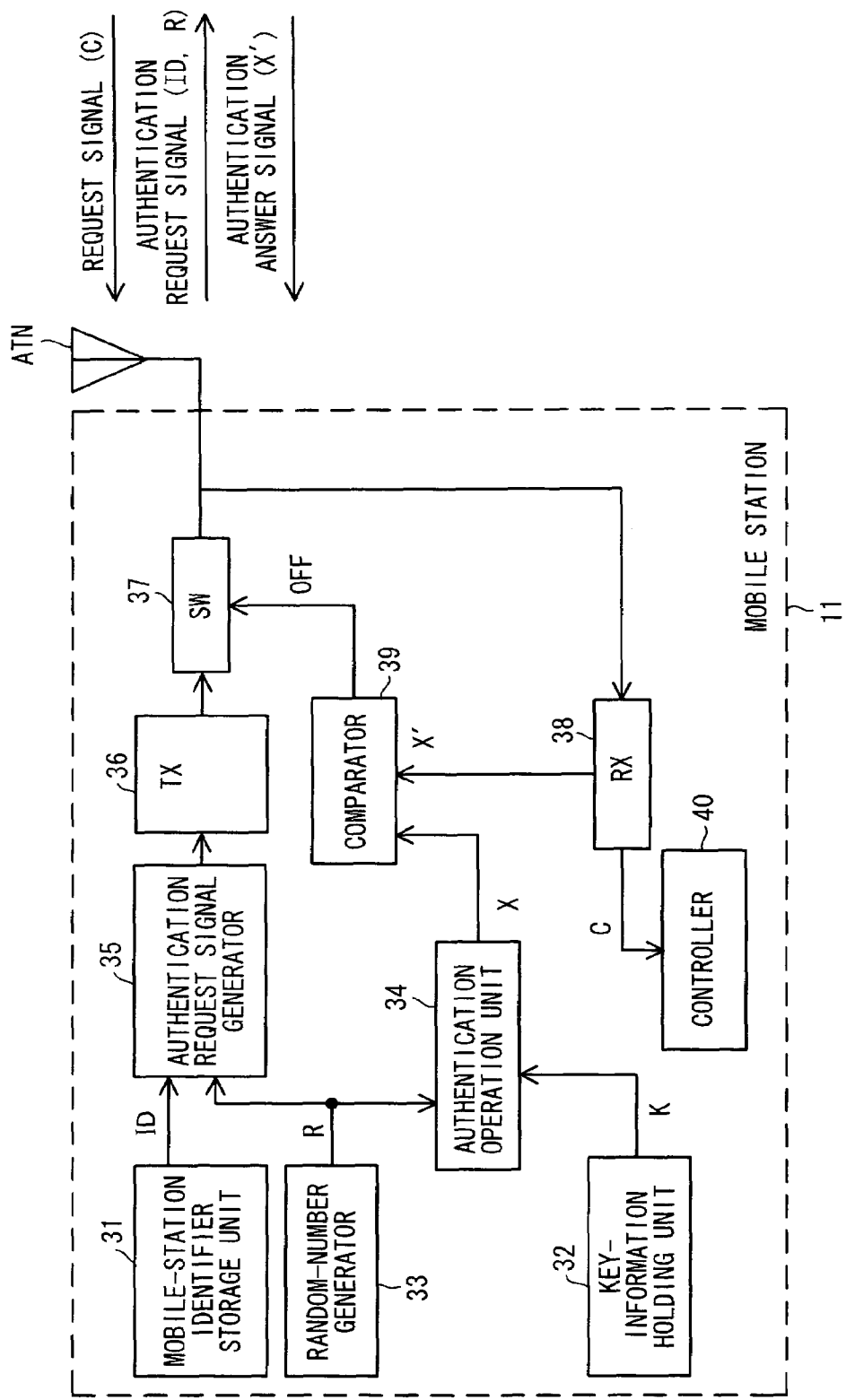
FIG. 4 is a diagram showing the structure of a mobile station according to the first embodiment.
Figure 5:
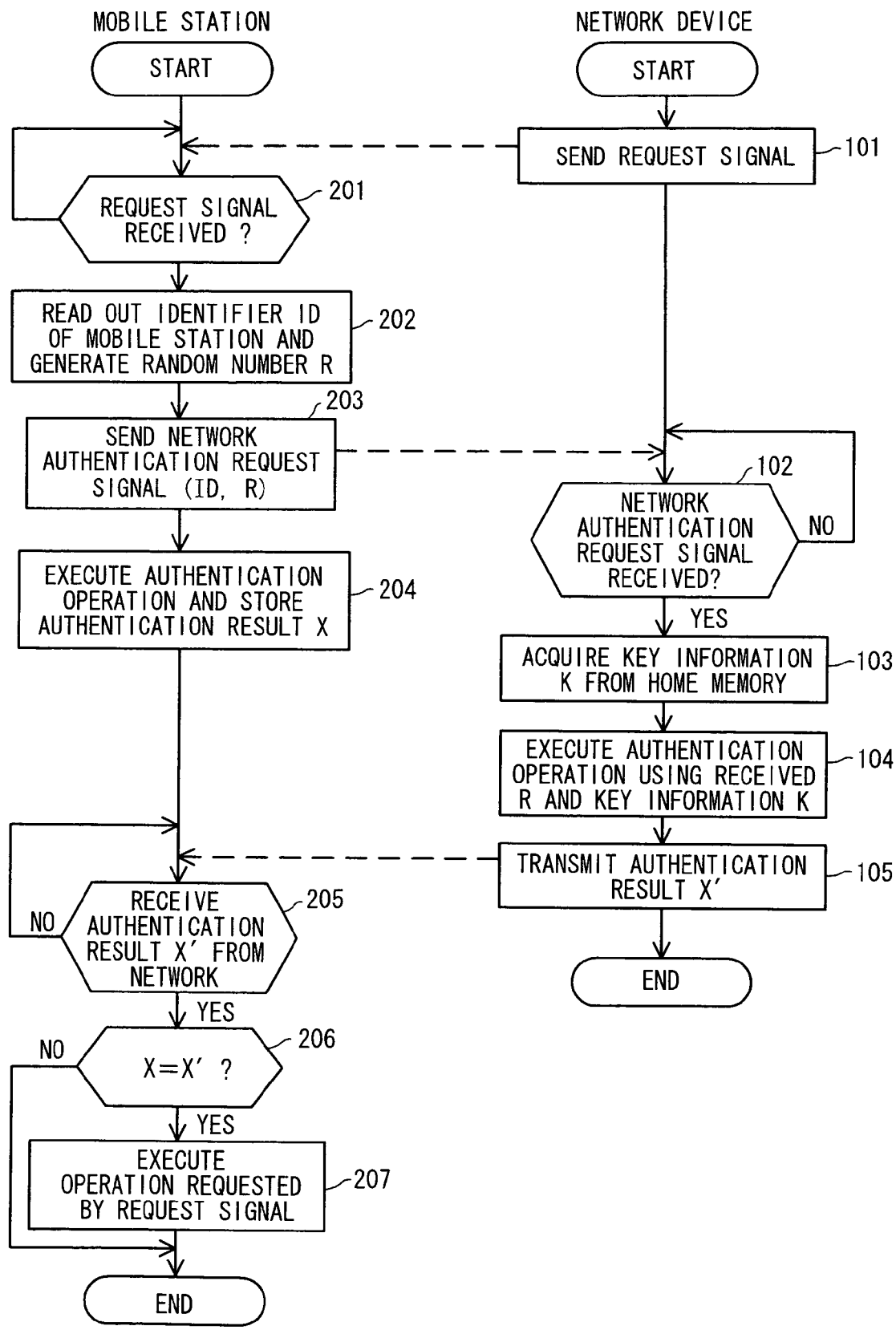
FIG. 5 is a flowchart of authentication processing according to the first embodiment.

FIGS. 3 and 4 are diagrams showing the structures of a network device and mobile station, respectively, according to the first embodiment, and FIG. 5 is a flowchart of authentication processing according to the first embodiment.

(a) Network Device

The network device of FIG. 3 includes a base station 21, a control station 22 and the home memory 23. The base station 21 has a transmitter (TX) 21a and a receiver (RX) 21b for wirelessly sending and receiving user data and control data to and from the mobile station 11. The control station 22 has a home-memory controller 22a for controlling writing and reading of data to and from the home memory 23, and the authentication operation unit 22b for executing an authentication operation using the key information K and random number R that correspond to the identifier ID of a mobile terminal that issued authentication request signal, and outputs the authentication result. The home memory 23 is provided with a key-information holding unit 23a that stores a corresponding relationship between mobile station identifiers (e.g., telephone numbers) ID and key information K that has been assigned to the mobile stations. Upon receiving the request signal C, which requests execution of a prescribed operation, from the network, the control station 22 sends this request signal to the base station 21 in whose area the mobile station that is the target of the operation requests resides. The transmitter 21a of the base station 21 transmits this request signal to the target mobile station.

The flowchart on the right side of FIG. 5 is the processing flow of the network device. In response to a request from the network, the control station 22 transmits the request signal C to the base station 21 in whose area the mobile station that is the target of 30 the operation requests resides, and the transmitter 21a of the base station 21 sends the request signal C to the mobile station 11 (step 101). Upon receiving the request signal C, the mobile station 11 sends the network device 12 the authentication request signal (ID, R) that contains the mobile-station identifier information ID and random number R. If the authentication request signal (ID, R) is received, the receiver 21b of the base station 21 sends this signal to the control station 22 (step 102). The home-memory controller 22a of the control station 22 acquires the key information K corresponding to the mobile-station identifier information ID from the key-information holding unit 23a and inputs this information to the authentication operation unit 22b (step 103). The authentication operation unit 22b executes a prescribed authentication operation using the random number R and acquired key information K contained in the authentication request signal (step 104) and sends the authentication result X' to the mobile station via the transmitter 21a of the base station (step 105).

(b) Mobile Station

FIG. 4 is a diagram showing the structure of the mobile station (mobile terminal). The mobile station includes the mobile-station identifier storage unit 31 storing the mobile-station identifier (e.g., telephone number) ID; the key-information holding unit 32 storing the key information K that has been assigned to the mobile station; the random-number generator 33 for generating any random number R; the authentication operation unit 34 for executing a prescribed authentication operation using the key information K and random number R; and authentication signal creation unit 35 for creating the authentication request signal (ID, R) containing the mobile-station identifier ID and random number R; a transmitter 36 for sending the authentication request signal (ID, R) and other user data to the base station; a switch 37 for turning the transmit signal on and off; a receiver 38 for receiving, from the base station, the request signal C from the network side, the authentication result X' from the network side and other transmit data; the comparator 39 for comparing the authentication result X computed on the side of the mobile station and the authentication result X' sent from the base station 21; and a controller 40 for exercising overall control for authentication of the mobile station 11 based upon the request signal C. If the result of the comparison is X=X', the switch 37 judges that the network device that transmitted the request signal C is authorized and executes the operation (halt to transmission of radio waves) conforming to the request signal C.

The flowchart on the left side of FIG. 5 is the processing flow of the mobile station. Upon receiving the request signal C from the network device 12 (step 201), the mobile station, under the control of the controller 40, reads the mobile-station identifier ID out of the mobile-station identifier storage unit 31 and inputs the ID to the authentication signal generator 35. Further, the random-number generator 33 generates the random number R under the control of the controller 40 and inputs the random number to the authentication operation unit 34 and authentication signal generator 35 (step 202). The authentication signal generator 35 creates the authentication request signal (ID, R) containing the mobile-station identifier ID and random number R and transmits this signal to the network device 12 via the transmitter 36 (step 203). Further, the authentication operation unit 34 executes a prescribed authentication operation using the key information K, which is being held in the key-information holding unit 32, and the random number R, and inputs the authentication result X to the comparator 39 (step 204). If the authentication result X' is received from the network device 12 (step 205), comparator 39 compares the authentication result X computed on the side of the mobile station and the authentication result X' sent from the network device (step 206). If X=X' does not hold, it is decided that the network device is unauthorized and the operation conforming to the request signal C is not executed. If X=X' holds, however, it is decided that the network device is authorized and the comparator inputs an OFF signal to the switch 37. In response, the switch 37 halts the input of the transmit signal, which is output from the transmitter 36, to the antenna ATN, thereby halting the transmission of radio waves (step 207).

(c) Overall Authentication Processing

The network device 12 sends the mobile station 11 the signal (request signal C) requesting a halt to transmission of radio waves. For example, if the owner of the mobile station 11 performs a remote control operation to halt the radio waves transmitted from the mobile station, a request signal arrives at the control station 22 via a public telephone network. The control station transmits the request signal to the base station 21 in whose area the mobile station 11 that is the target of the operation request resides, and the base station 21 sends the request signal C to the mobile station 11 from the transmitter 21a.

When the signal (request signal C) requesting halt of radio-wave emission is received from the network device 12, the controller 40 in the mobile station 11 recognizes the signal via the receiver (RX). Though the operation of various components within the mobile station 11 is thenceforth controlled by the controller 40, the individual control signals for implementing such control are not shown in the drawings.

Next, in order to transmit the authentication request signal (ID, R) from the mobile station 11 to the network device 12, the mobile-station identifier information (ID) is read out of the mobile-station identifier storage unit 31 and the random number (R) is generated by the random-number generator 33. The authentication request signal generator 35 generates the authentication request signal that contains the mobile-station identifier information (ID) and random number (R) and transmits this signal to the network device via the transmitter 36. Further, the authentication operation unit 34 performs the authentication operation using the key information (K), which is being held by the key-information holding unit 32, and the random number (R), and generates the authentication result (X).

On the other hand, the network device performs the operation indicated by the flowchart on the right side of FIG. 5. Specifically, the mobile-station identifier (ID) included in the authentication request signal (ID, R) is sent to the home memory 23 to obtain key information (K) identical with the key information being held by the mobile station 11. Next, an authentication operation identical with that of the mobile station 11 is performed using the key information (K) and the received random number (R), and the authentication result (X') is transmitted to the mobile station 11.

The comparator 39 of the mobile station 11 compares the authentication result (X') received via the receiver 38 and the authentication result (X) computed by the authentication operation unit 34 and generates the OFF signal, which is sent to the switch 37 to halt transmission, only if the two results agree.

Thus, by having the mobile station execute authentication processing identical with existing authentication processing executed in a network device, authentication processing on the side of the mobile station can be implemented without using a special set-up.

(C) Second Embodiment

Figure 6:
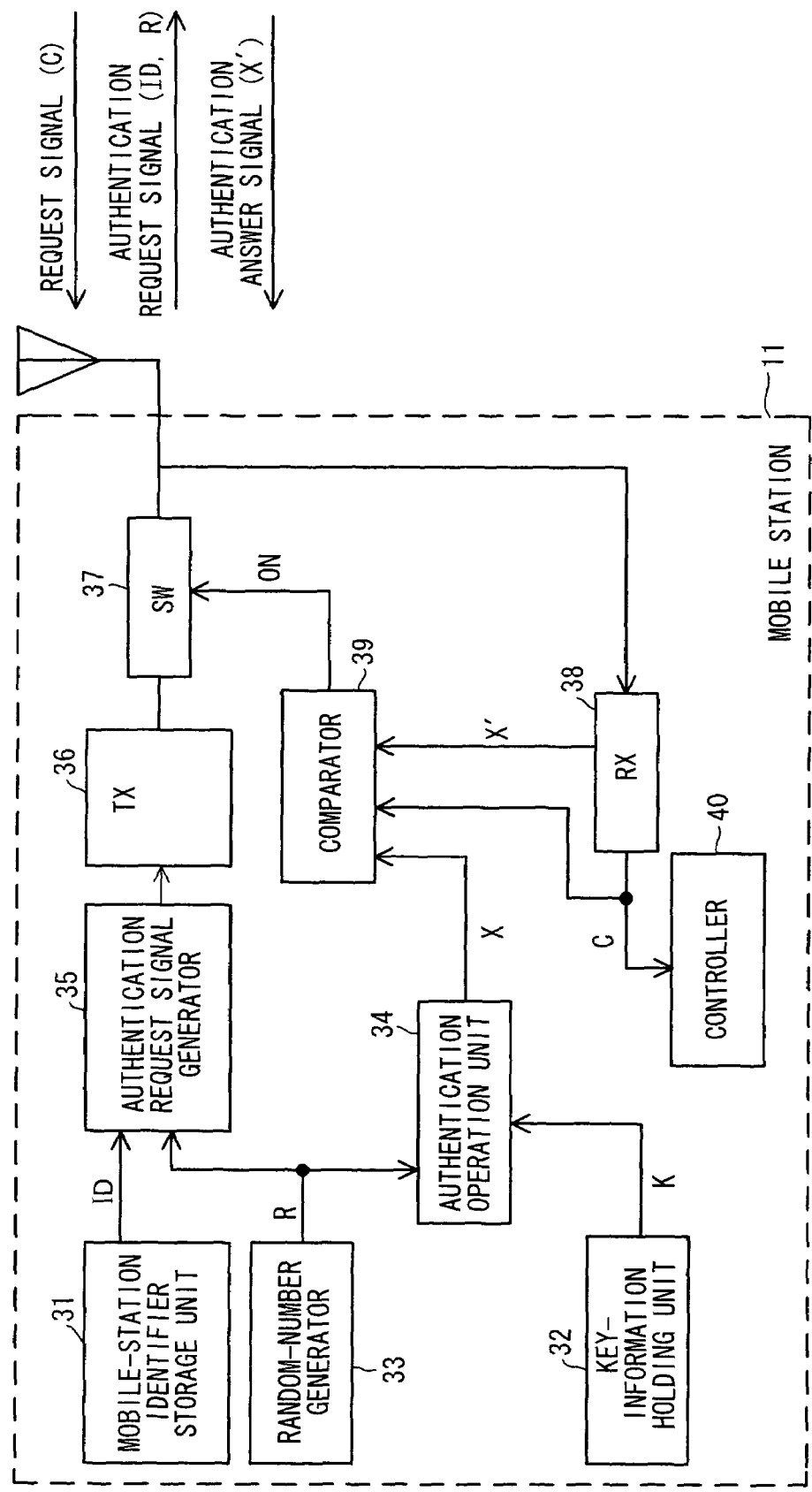
FIG. 6 is a diagram showing the structure of a mobile station according to a second embodiment of the present invention.

FIG. 6 is a diagram illustrating the structure of a mobile station according to a second embodiment of the present invention. Here components identical with those of the mobile station of the first embodiment in FIG. 4 are designated by like reference characters.

The first embodiment relates to a case where the network device 12 sends the mobile station a signal requesting a halt to transmission of radio waves. The second embodiment, however, is one in which a signal requesting release of a radio-wave transmission is sent to a mobile station in which transmission of radio waves has been halted. It should be noted that the structure and operation of the network device in the second embodiment are the same as those of the network device of the first embodiment and are not described again. The same is true also in third to eighth embodiments below.

When the mobile station 11 whose emission of radio waves has been halted by a request from the network device 12 receives a signal (request signal C) from the network device 12 requesting resumption of emission of radio waves, the controller 40 recognizes the request signal through the receiver 38 and thenceforth controls the overall authentication operation of the mobile station. The request signal (C) is input also to the comparator 39, which inputs the ON signal to the switch 37 in order to perform transmission (radio-wave emission) temporarily.

Next, in order to transmit the authentication request signal (ID, R) to the network device 12, the mobile-station identifier information (ID) is read out of the mobile-station identifier storage unit 31 and the random number (R) is generated by the random-number generator 33. The authentication request signal generator 35 generates the authentication request signal that contains the mobile-station identifier information (ID) and random number (R) and transmits this signal to the network device via the transmitter 36. Further, the authentication operation unit 34 performs the authentication operation using the key information (K), which is being held by the key-information holding unit 32, and the random number (R), and generates the authentication result (X).

On the other hand, the network device 12 performs the operation indicated by the flowchart on the right side of FIG. 5. Specifically, the mobile-station identifier (ID) included in the received authentication request signal (ID, R) is sent to the home memory 23 to obtain key information (K) identical with the key information being held by the mobile station 11. Next, an authentication operation identical with that of the mobile station 11 is performed using the key information (K) and the received random number (R), and the authentication result (X') is transmitted to the mobile station 11.

The comparator 39 of the mobile station 11 compares the authentication result (X') received via the receiver 38 and the authentication result (X) computed by the authentication operation unit 34 and generates the OFF signal, which is sent to the switch 37 to halt transmission, only if it is detected that the two results do not agree. If the two results do agree, the comparator continues to output the ON signal, which is already being output. As a result, operation for releasing the radio-wave transmission is completed.

Thus, by having the mobile station execute authentication processing identical with existing authentication processing executed in a network device, authentication processing on the side of the mobile station can be implemented without using a special set-up.

(C) Third Embodiment

Figure 7:
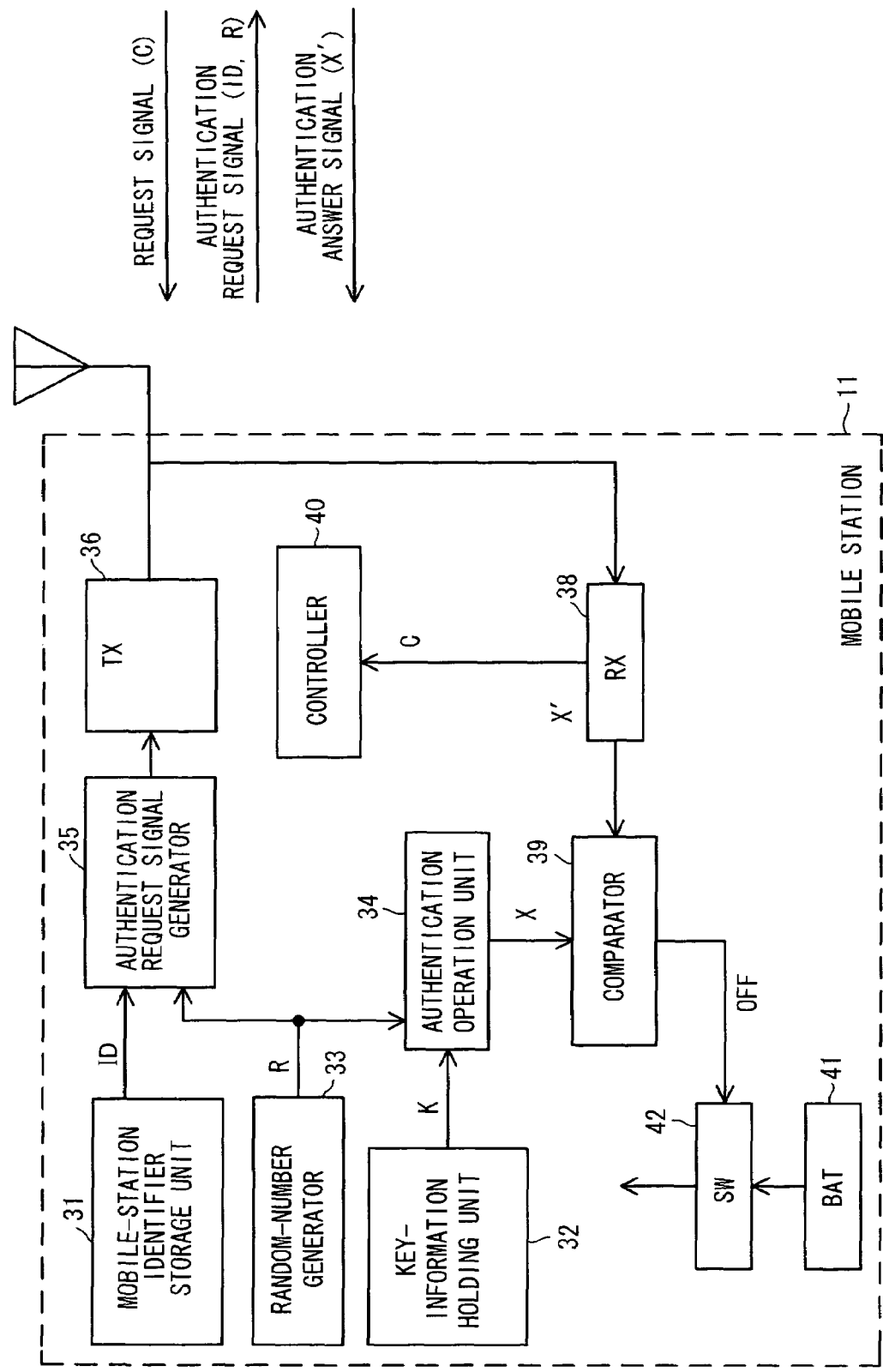
FIG. 7 is a diagram showing the structure of a mobile station according to a third embodiment of the present invention.

FIG. 7 is a diagram illustrating the structure of a mobile station according to a third embodiment of the present invention. Here components identical with those of the mobile station of the first embodiment in FIG. 4 are designated by like reference characters. The third embodiment relates to a case where a request signal for cutting off the power supply of the mobile station 11 is received.

When the mobile station 11 receives a signal (request signal C) from the network device 12 requesting cut-off of the power supply, the controller 40 recognizes the request signal through the receiver 38 and thenceforth controls the overall authentication operation of the mobile station.

Next, in order to transmit the authentication request signal (ID, R) to the network device 12, the mobile-station identifier information (ID) is read out of the mobile-station identifier storage unit 31 and the random number (R) is generated by the random-number generator 33. The authentication request signal generator 35 generates the authentication request signal that contains the mobile-station identifier information (ID) and random number (R) and transmits this signal to the network device 12 via the transmitter 36. Further, the authentication operation unit 34 performs the authentication operation using the key information (K), which is being held by the key-information holding unit 32, and the random number (R), and generates the authentication result (X).

On the other hand, the network device 12 performs the operation indicated by the flowchart on the right side of FIG. 5. Specifically, the mobile-station identifier (ID) included in the received authentication request signal (ID, R) is sent to the home memory 23 to obtain key information (K) identical with the key information being held by the mobile station 11. Next, an authentication operation identical with that of the mobile station 11 is performed using the key information (K) and the received random number (R), and the authentication result (X') is transmitted to the mobile station 11.

The comparator 39 of the mobile station 11 compares the authentication result (X') received via the receiver 38 and the authentication result (X) computed by the authentication operation unit 34 and outputs the OFF signal to a switch 42 only if it is detected that the two results agree, thereby halting supply of power from a power supply (BAT) 41 to the entire apparatus or to some of the circuits of the apparatus. The foregoing relates to a case where cut-off of the power supply is requested. However, control can be performed in similar fashion also in a case where the mobile station is made to transition to a standby operation.

Thus, by having the mobile station execute authentication processing identical with existing authentication processing executed in a network device, authentication processing on the side of the mobile station can be implemented without using a special set-up.

(E) Fourth Embodiment

Figure 8:
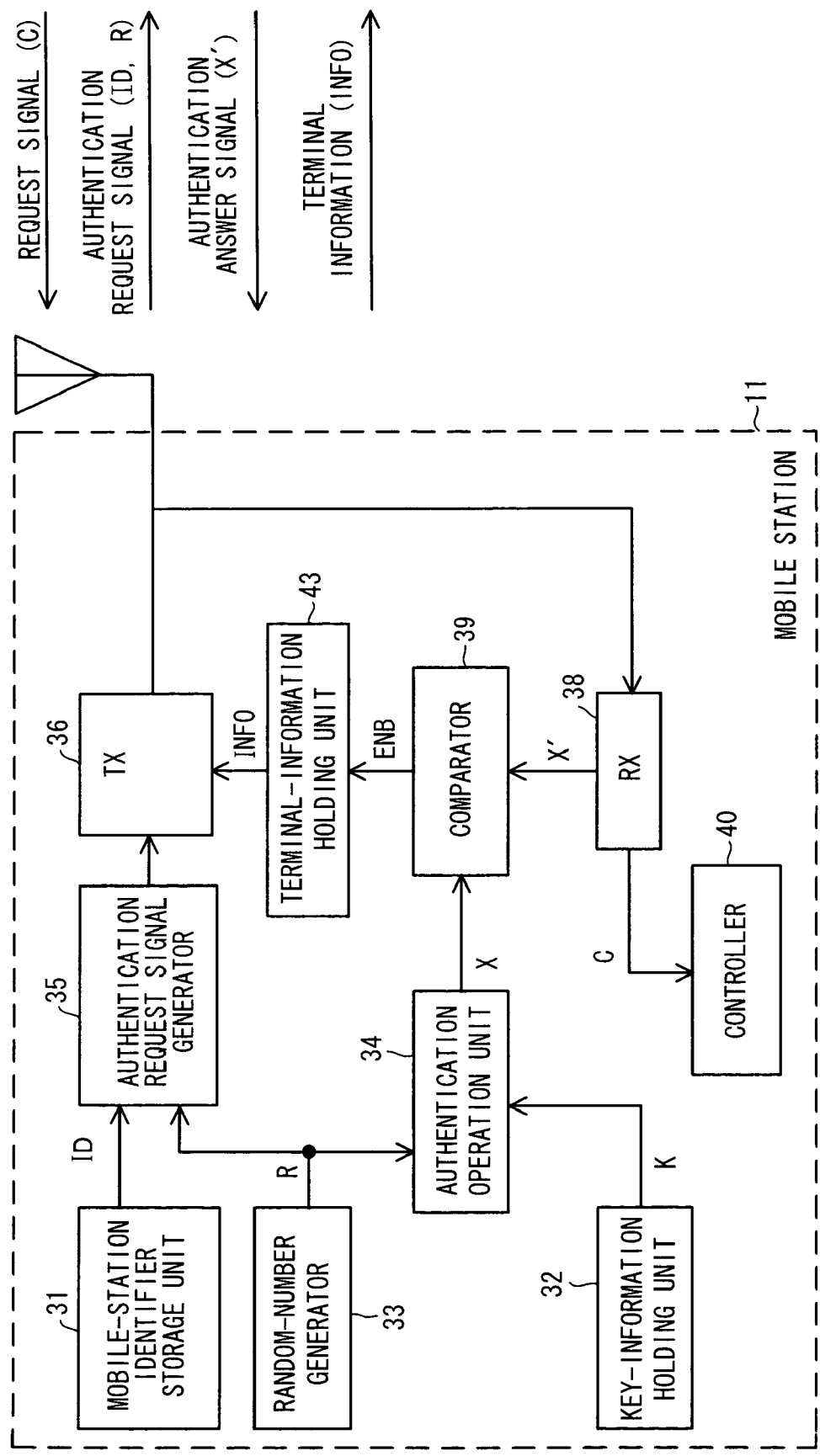
FIG. 8 is a diagram showing the structure of a mobile station according to a fourth embodiment of the present invention.

FIG. 8 is a diagram illustrating the structure of a mobile station according to a fourth embodiment of the present invention. Here components identical with those of the mobile station of the first embodiment in FIG. 4 are designated by like reference characters. The fourth embodiment relates to a case where a signal requesting read-out of terminal information is received.

When the mobile station 11 receives a signal (request signal C) from the network device 12 requesting transmission of terminal information, the controller 40 recognizes the request signal through the receiver 38 and thenceforth controls the overall authentication operation of the mobile station.

Next, in order to transmit the authentication request signal (ID, R) to the network device 12, the mobile-station identifier information (ID) is read out of the mobile-station identifier storage unit 31 and the random number (R) is generated by the random-number generator 33. The authentication request signal generator 35 generates the authentication request signal that contains the mobile-station identifier information (ID) and random number (R) and transmits this signal to the network device 12 via the transmitter 36. Further, the authentication operation unit 34 performs the authentication operation using the key information (R), which is being held by the key-information holding unit 32, and the random number (R), and generates the authentication result (X).

On the other hand, the network device 12 performs the operation indicated by the flowchart on the right side of FIG. 5. Specifically, the mobile-station identifier (ID) included in the received authentication request signal (ID, R) is sent to the home memory 23 to obtain key information (K) identical with the key information being held by the mobile station 11. Next, an authentication operation identical with that of the mobile station 11 is performed using the key information (K) and the received random number (R), and the authentication result (X') is transmitted to the mobile station 11.

The comparator 39 of the mobile station 11 compares the authentication result (X') received via the receiver 38 and the authentication result (X) computed by the authentication operation unit 34 and outputs a signal (ENB), which allows transmission of terminal information (INFO), to a terminal-information holding unit 43 only if agreement between the two results is detected. As a result, terminal information (INFO) being held in the terminal-information holding unit 43 is transmitted to the network device 12 via the transmitter 36.

Various information is conceivable as terminal information, such as time a mobile station is in use per day or month, number of times used, number of incoming calls, billing information, outgoing-call destination number and originator number in case of an incoming call.

Thus, by having the mobile station execute authentication processing identical with existing authentication processing executed in a network device, authentication processing on the side of the mobile station can be implemented without using a special set-up.

(F) Fifth Embodiment

Figure 9:
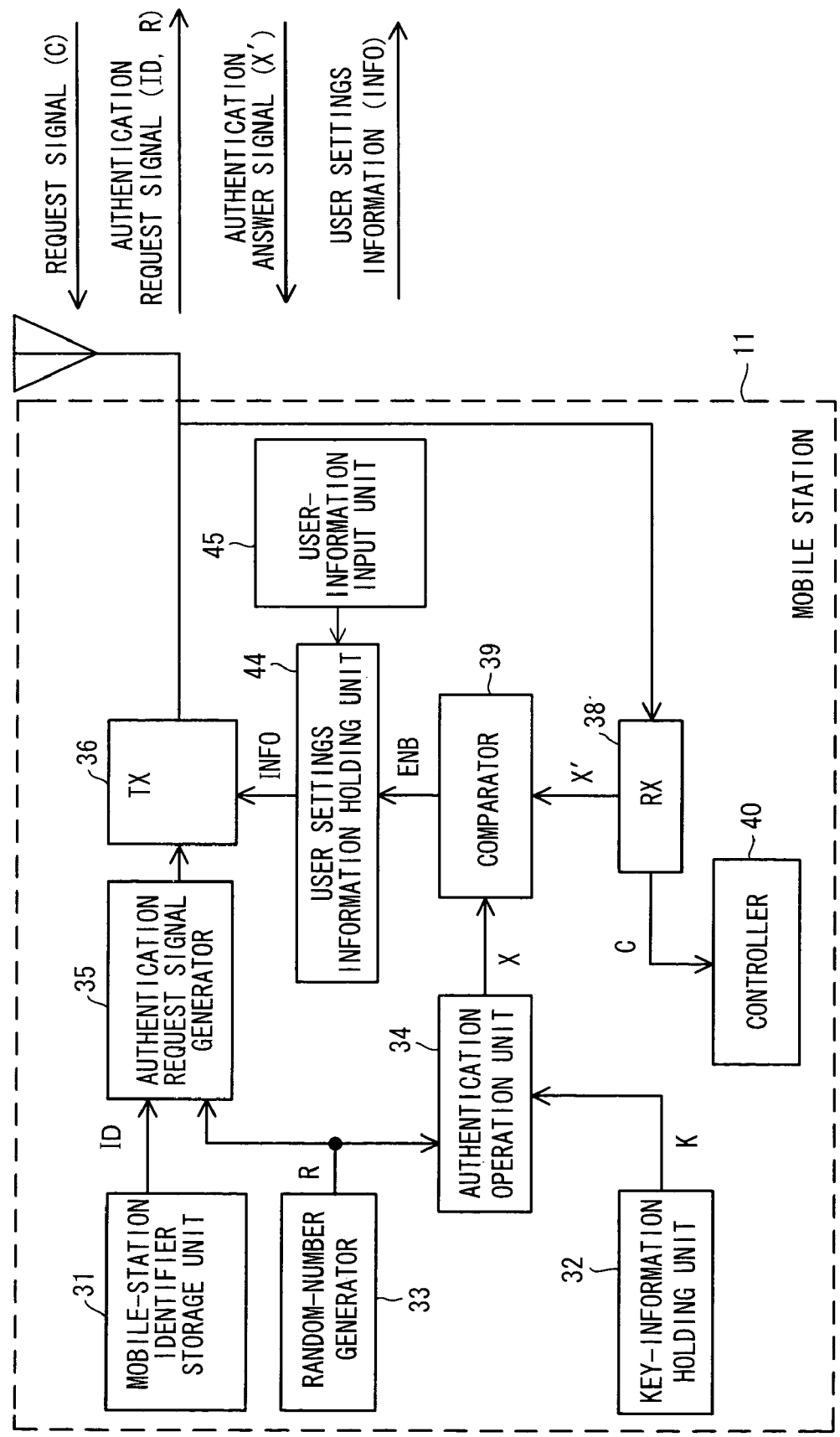
FIG. 9 is a diagram showing the structure of a mobile station according to a fifth embodiment of the present invention.

FIG. 9 is a diagram illustrating the structure of a mobile station according to a fifth embodiment of the present invention. Here components identical with those of the mobile station of the first embodiment in FIG. 4 are designated by like reference characters. The fifth embodiment relates to a case where a request signal for reading out user settings information, which has been set by a user, is received.

The mobile station 11 has a user-information input unit 45 that is employed by the user to input user settings information (INFO) to a user settings information holding unit 44. The user-information input unit 45 can be implemented by a key button on the mobile station or by another computer terminal connected via a connector. Content set by a user, e.g., a list (so-called telephone directory information) showing correspondence between telephone numbers and names, and a self-introductory message, such as owner name and address, is an example of the user settings information.

When the mobile station 11 receives a signal (request signal C) from the network device 12 requesting transmission of user settings information, the controller 40 recognizes the request signal through the receiver 38 and thenceforth controls the overall authentication operation of the mobile station.

Next, in order to transmit the authentication request signal (ID, R) to the network device 12, the mobile-station identifier information (ID) is read out of the mobile-station identifier storage unit 31 and the random number (R) is generated by the random-number generator 33. The authentication request signal generator 35 generates the authentication request signal that contains the mobile-station identifier information (ID) and random number (R) and transmits this signal to the network device 12 via the transmitter 36. Further, the authentication operation unit 34 performs the authentication operation using the key information (K), which is being held by the key-information holding unit 32, and the random number (R), and generates the authentication result (X).

On the other hand, the network device performs the operation indicated by the flowchart on the right side of FIG. 5. Specifically, the mobile-station identifier (ID) included in the received authentication request signal (ID, R) is sent to the home memory 23 to obtain key information (K) identical with the key information being held by the mobile station 11. Next, an authentication operation identical with that of the mobile station 11 is performed using the key information (K) and the received random number (R), and the authentication result (X') is transmitted to the mobile station 11.

The comparator 39 of the mobile station 11 compares the authentication result (X') received via the receiver 38 and the authentication result (X) computed by the authentication operation unit 34 and outputs a signal (ENB), which allows transmission of user settings information (INFO), to the user settings information holding unit 44 only if agreement between the two results is detected. As a result, user settings information (INFO) being held in the user settings information holding unit 44 is transmitted to the network device 12 via the transmitter 36.

Thus, by having the mobile station execute authentication processing identical with existing authentication processing executed in a network device, authentication processing on the side of the mobile station can be implemented without using a special set-up.

(G) Sixth Embodiment

Figure 10:
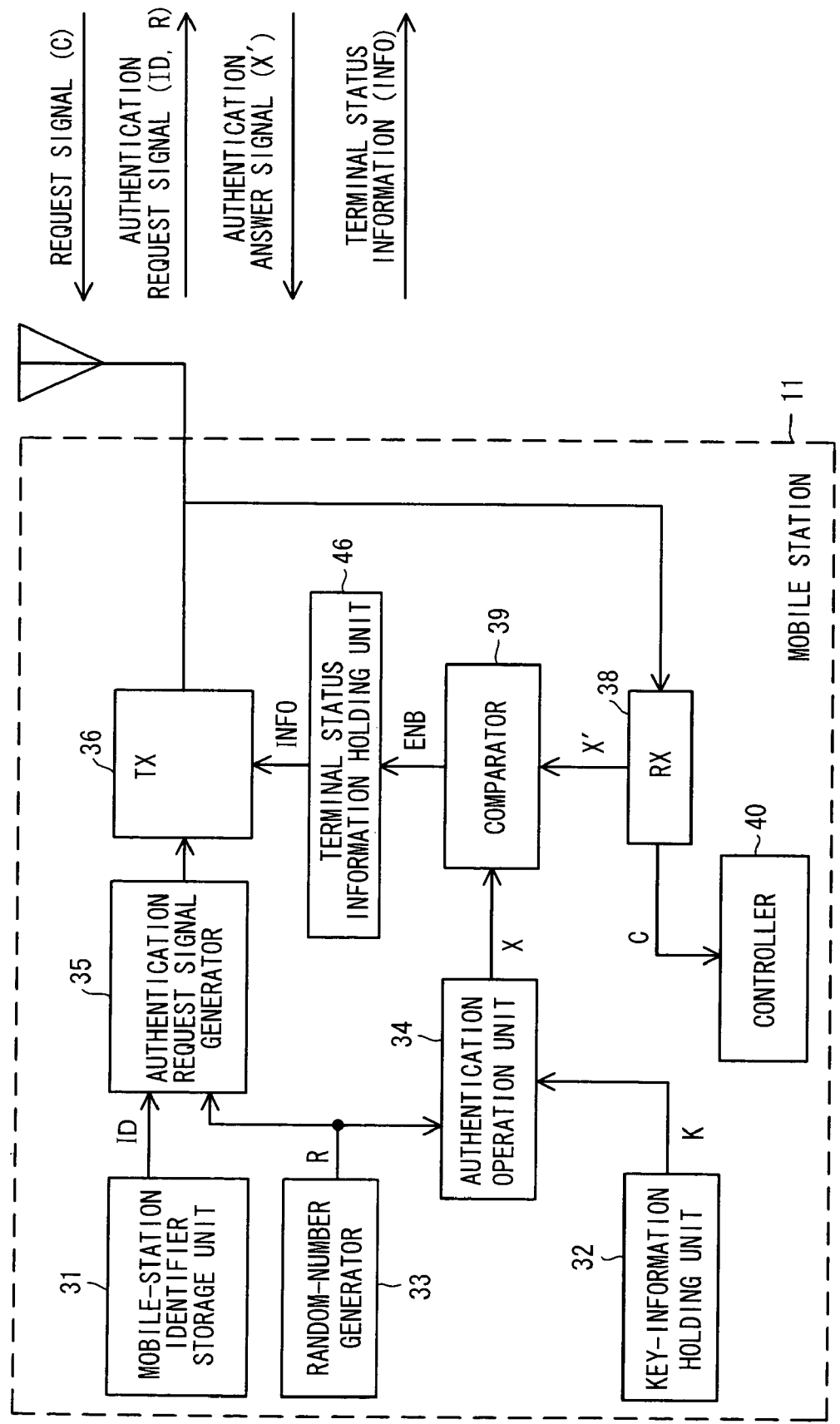
FIG. 10 is a diagram showing the structure of a mobile station according to a sixth embodiment of the present invention.

FIG. 10 is a diagram illustrating the structure of a mobile station according to a sixth embodiment of the present invention. Here components identical with those of the mobile station of the first embodiment in FIG. 4 are designated by like reference characters. The sixth embodiment relates to a case where a request signal for reading out status information of a terminal (mobile station) is received. Residual battery capacity, travelling velocity and position information, etc., are examples of status information of a terminal.

When the mobile station 11 receives a signal (request signal C) from the network device 12 requesting transmission of terminal status information, the controller 40 recognizes the request signal through the receiver 38 and thenceforth controls the overall authentication operation of the mobile station.

Next, in order to transmit the authentication request signal (ID, R) to the network device 12, the mobile-station identifier information (ID) is read out of the mobile-station identifier storage unit 31 and the random number (R) is generated by the random-number generator 33. The authentication request signal generator 35 generates the authentication request signal that contains the mobile-station identifier information (ID) and random number (R) and transmits this signal to the network device 12 via the transmitter 36. Further, the authentication operation unit 34 performs the authentication operation using the key information (K), which is being held by the key-information holding unit 32, and the random number (R), and generates the authentication result (X).

On the other hand, the network device performs the operation indicated by the flowchart on the right side of FIG. 5. Specifically, the mobile-station identifier (ID) included in the received authentication request signal (ID, R) is sent to the home memory 23 to obtain key information (K) identical with the key information being held by the mobile station 11. Next, an authentication operation identical with that of the mobile station 11 is performed using the key information (K) and the received random number (R), and the authentication result (X') is transmitted to the mobile station 11.

The comparator 39 of the mobile station 11 compares the authentication result (X') received via the receiver 38 and the authentication result (X) computed by the authentication operation unit 34 and outputs a signal (ENB), which allows transmission of terminal status information (INFO), to a terminal status information holding unit 46 only if agreement between the two results is detected. As a result, terminal status information (INFO) being held in the terminal status information holding unit 46 is transmitted to the network device 12 via the transmitter 36.

Thus, by having the mobile station execute authentication processing identical with existing authentication processing executed in a network device, authentication processing on the side of the mobile station can be implemented without using a special set-up.

(H) Seventh Embodiment

Figure 11:
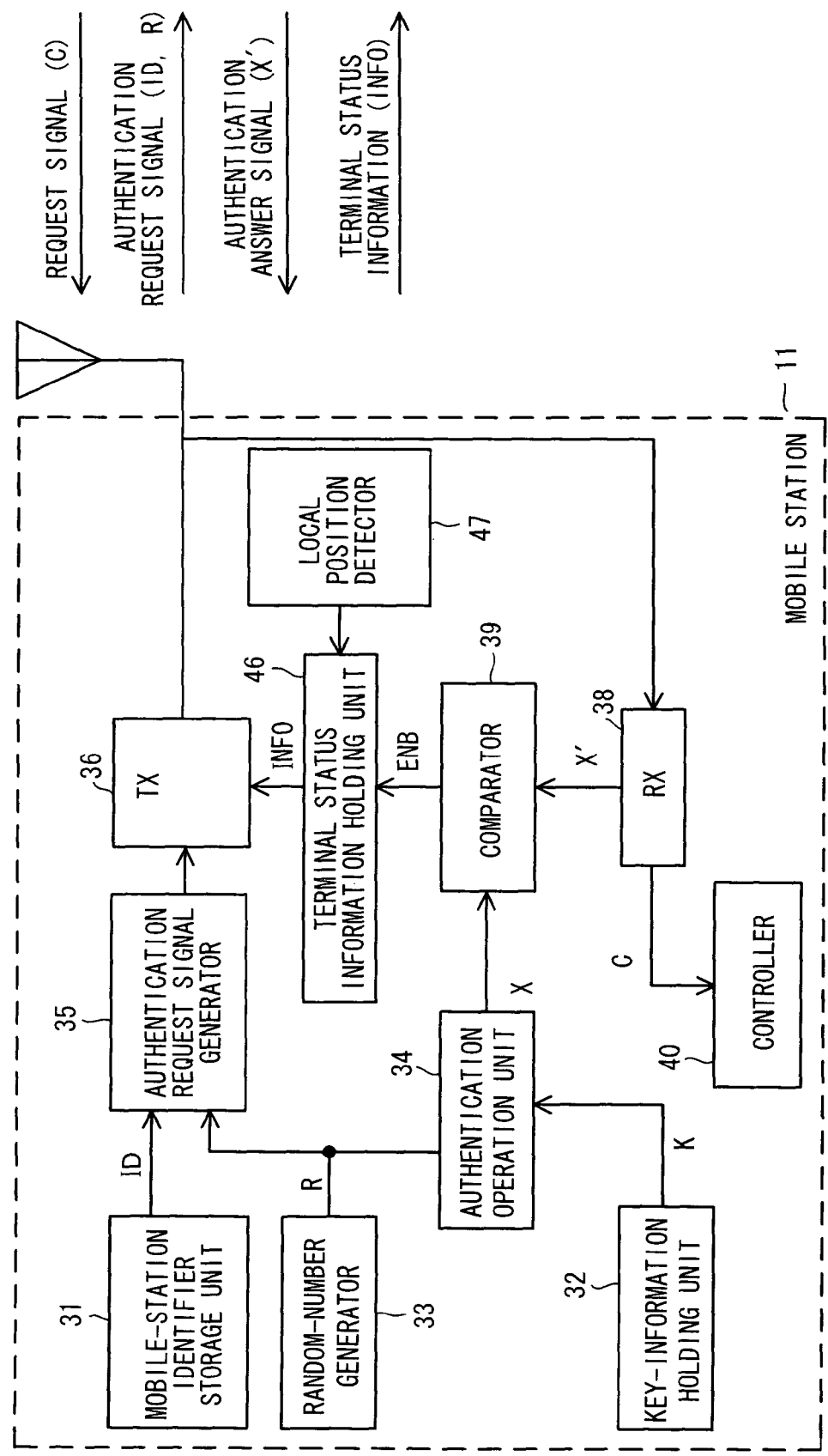
FIG. 11 is a diagram showing the structure of a mobile station according to a seventh embodiment of the present invention.

FIG. 11 is a diagram illustrating the structure of a mobile station according to a seventh embodiment of the present invention. Here components identical with those of the mobile station of the first embodiment in FIG. 4 are designated by like reference characters. The seventh embodiment relates to a case where a request signal for reading out terminal position information as terminal status information is received. It should be noted that the structure and operation of the network device in the seventh embodiment are the same as those of the network device of the first embodiment.

The mobile station 11 has a local position detector 47 by which the mobile station 11 detects its own position. This function can be implemented utilizing a GPS (Global Positioning System), by way of example. The information representing the detected local position is stored in the terminal status information holding unit 46 as terminal status information (INFO).

When the mobile station 11 receives a signal (request signal C) from the network device 12 requesting transmission of terminal status information (position information), the controller 40 recognizes the request signal through the receiver 38 and thenceforth controls the overall authentication operation of the mobile station.

Next, in order to transmit the authentication request signal (ID, R) to the network device 12, the mobile-station identifier information (ID) is read out of the mobile-station identifier storage unit 31 and the random number (R) is generated by the random-number generator 33. The authentication request signal generator 35 generates the authentication request signal that contains the mobile-station identifier information (ID) and random number (R) and transmits this signal to the network device 12 via the transmitter 36. Further, the authentication operation unit 34 performs the authentication operation using the key information (K), which is being held by the key-information holding unit 32, and the random number (R), and generates the authentication result (X).

On the other hand, the network device performs the operation indicated by the flowchart on the right side of FIG. 5. Specifically, the mobile-station identifier (ID) included in the received authentication request signal (ID, R) is sent to the home memory 23 to obtain key information (K) identical with the key information being held by the mobile station 11. Next, an authentication operation identical with that of the mobile station 11 is performed using the key information (K) and the received random number (R), and the authentication result (X') is transmitted to the mobile station 11.

The comparator 39 of the mobile station 11 compares the authentication result (X') received via the receiver 38 and the authentication result (X) computed by the authentication operation unit 34 and outputs a signal (ENB), which allows transmission of terminal status information (INFO), to the terminal status information holding unit 46 only if agreement between the two results is detected. As a result, terminal status information (=information of the station's own position) being held in the terminal status information holding unit 46 is transmitted to the network device 12 via the transmitter 36.

Thus, by having the mobile station execute authentication processing identical with existing authentication processing executed in a network device, authentication processing on the side of the mobile station can be implemented without using a special set-up.

(H) Eighth Embodiment

Figure 12:
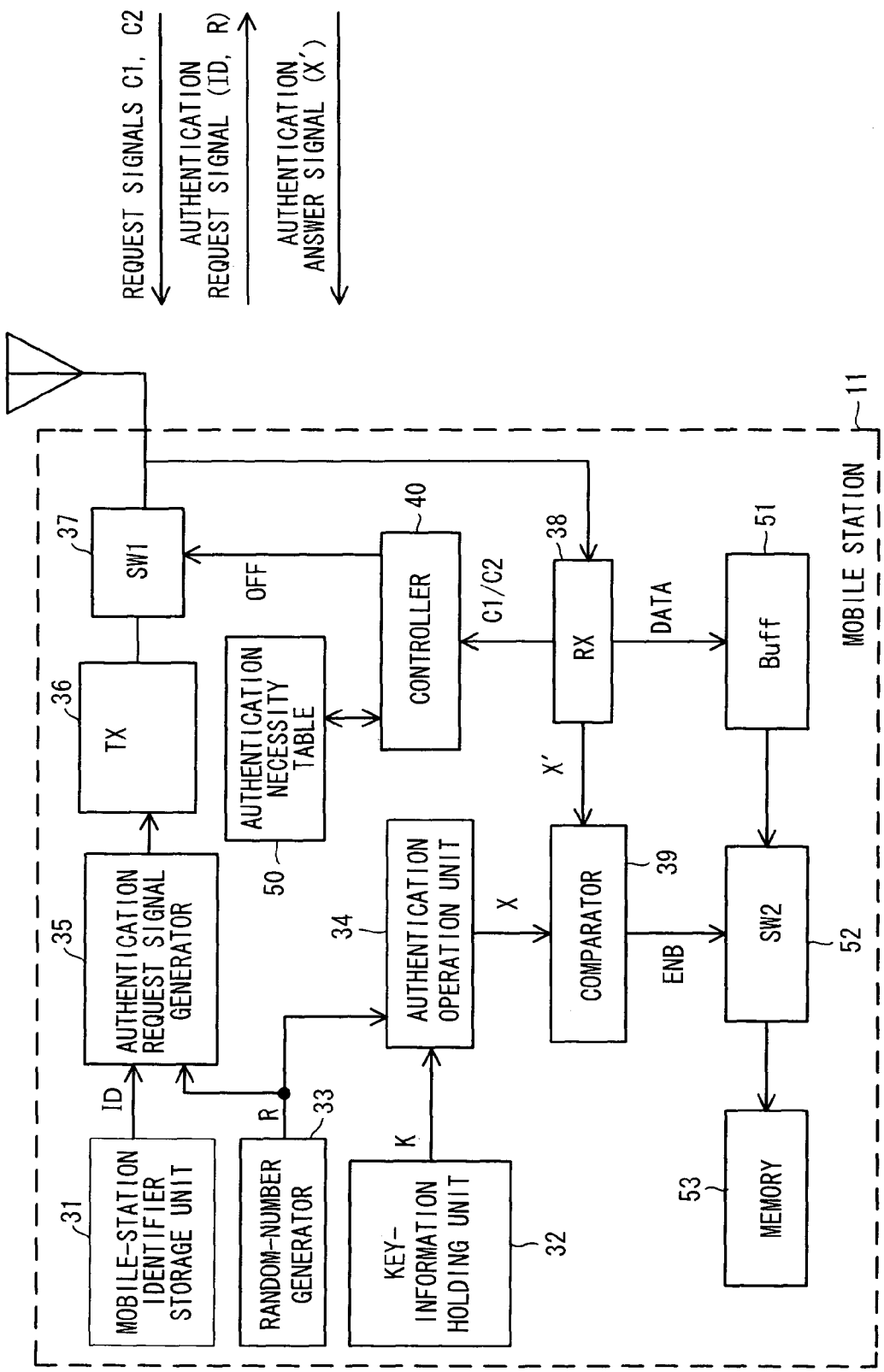
FIG. 12 is a diagram showing the structure of a mobile station according to an eighth embodiment of the present invention.

FIG. 12 is a diagram illustrating the structure of a mobile station according to eighth embodiment of the present invention. Here components identical with those of the mobile station of the first embodiment in FIG. 4 are designated by like reference characters. The eighth embodiment is such that in a case where there exist a request signal requiring authentication as to whether a base station is an authorized base station and a request signal not requiring such authentication, a mobile station controls execution of operation upon identifying which of these the request signal is.

In FIG. 12, the mobile station 11 has an authentication necessity table 50 storing whether or not a request signal requires authentication. For example, it is assumed that a request to halt radio-wave emission is a request not requiring authentication, and that a request to write data appended to the request signal to a memory within the mobile station is a request requiring authentication.

Figure 13:
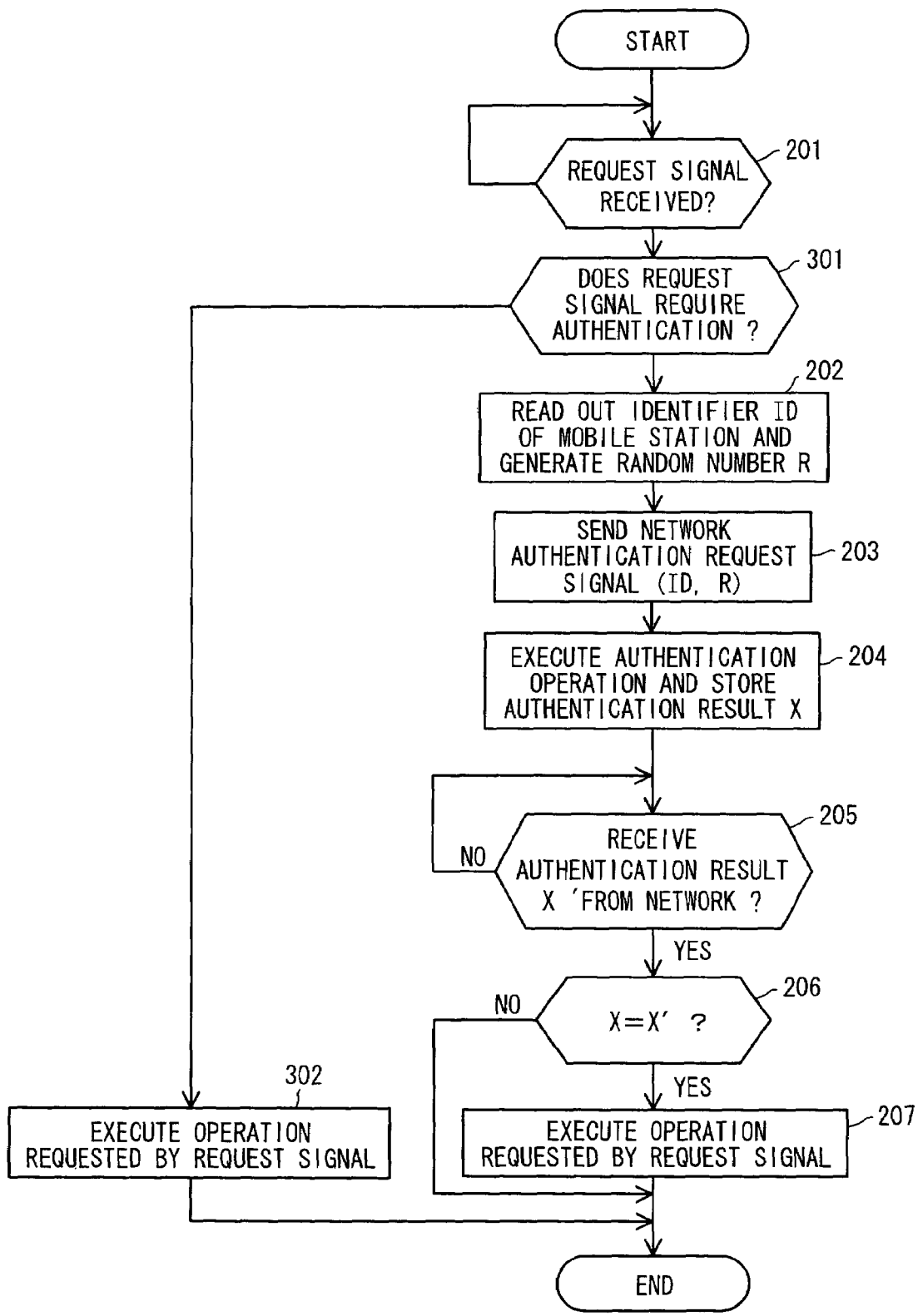
FIG. 13 is a flowchart of authentication processing in a mobile station according to the eighth embodiment.
Figure 14:
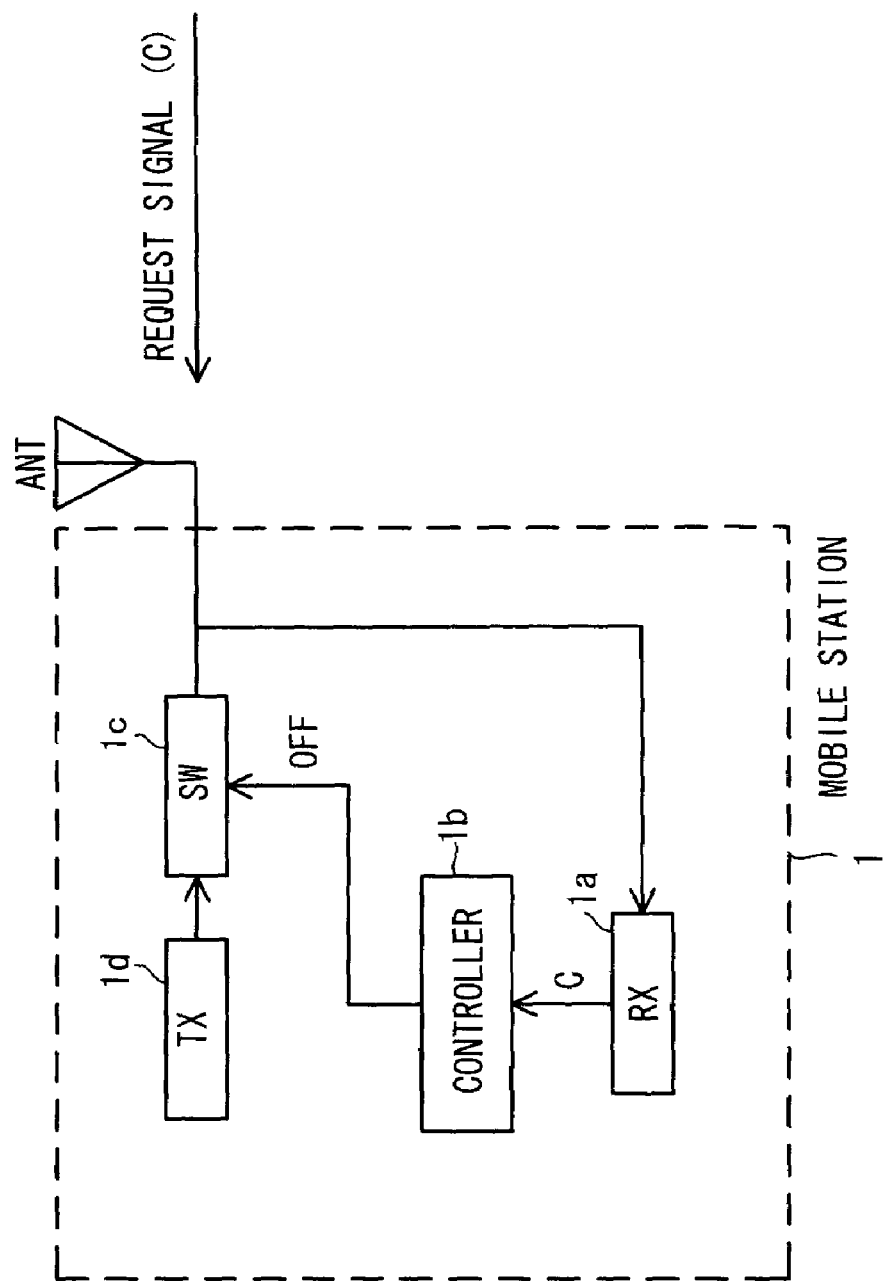
FIG. 14 is a diagram useful in describing the prior art in a case where a base station requests a halt to emission of radio waves from a mobile station.

FIG. 13 is a flowchart of processing useful in describing the operation of the eighth embodiment. Processing steps identical with those of the flowchart on the left side of FIG. 5 are designated by like step numbers. This flowchart differs by the addition of a step 301, which is for determining whether a request signal is one requiring authentication processing, and a step 302 which, if the request signal is one not requiring authentication, is for immediately executing the operation that is in accordance with this request signal. It should be noted that if the request signal is one requiring authentication, processing from step 202 onward is executed in a manner similar to that of the first embodiment.

If the owner of the mobile station (mobile unit) 11 performs a remote control operation to halt the radio waves transmitted from the mobile station, a request signal C1 arrives at the control station 22 (see FIG. 3) via a public telephone network. The control station transmits the request signal to the base station 21 in whose area the mobile station 11 that is the target of the operation request resides, and the base station 21 sends the request signal C1 to the mobile station 11 from the transmitter 21*a*. Further, if the owner of the mobile station 11 performs a remote control operation in order to rewrite telephone directory information within the mobile station, then a request signal C2 to which rewrite data (Data) has been attached arrives at the control station 22 via the public telephone network. Thereafter, in a manner similar to that described above, the base station 21 sends the mobile station 11 the request signal C2 to which the rewrite data (Data) has been attached.

When the mobile station 11 receives the signal (request signal C1) requesting halt of radio-wave emission from the network device 12, the controller 40 recognizes the signal via the receiver 38. Next, the controller 40 refers to the authentication necessity table 50, thereby recognizing that the request is one not requiring an authentication operation, and immediately transmits the OFF signal to the switch 37, thereby halting emission of radio waves.

When the mobile station 11 receives the request signal C2 from the network device 12 requesting rewriting of memory content, the controller 40 recognizes the request signal through the receiver 38. Further, the mobile station stores data (Data), which has been attached to and sent with the request signal C2, in a temporary storage unit (BUFF) 51 in order to be used after the authentication is completed. Next, the controller 40 refers to the authentication necessity table 50, verifies that the received request signal C2 is one requiring the authentication operation and starts the authentication operation described below.

Specifically, in order to transmit the authentication request signal (ID, R) to the network device 12, the mobile-station identifier information (ID) is read out of the mobile-station identifier storage unit 31 and the random number (R) is generated by the random-number generator 33. The authentication request signal generator 35 generates the authentication request signal that contains the mobile-station identifier information (ID) and random number (R) and transmits this signal to the network device 12 via the transmitter 36. Further, the authentication operation unit 34 performs the authentication operation using the key information (K), which is being held by the key-information holding unit 32, and the random number (R), and generates the authentication result (X).

On the other hand, the network device 12 performs the operation indicated by the flowchart on the right side of FIG.

5. Specifically, the mobile-station identifier (ID) included in the received authentication request signal (ID, R) is sent to the home memory 23 to obtain key information (K) identical with the key information being held by the mobile station 11. Next, an authentication operation identical with that of the mobile station 11 is performed using the key information (K) and the received random number (R), and the authentication result (X') is transmitted to the mobile station 11.

The comparator 39 of the mobile station 11 compares the authentication result (X') received via the receiver 38 and the authentication result (X) computed by the authentication operation unit 34 and outputs a signal (Enb), which allows passage of the rewrite data (Data), to the switch 52 only if agreement between the two results is detected. As a result, the content of memory 53 is rewritten by the data (Data) that has been stored in the temporary storage unit 51.

Thus, by having the mobile station execute authentication processing identical with existing authentication processing executed in a network device, authentication processing on the side of the mobile station can be implemented without using a special set-up.

Thus, in accordance with the present invention, when a request to execute an operation is received from a device on the side of a network, control is exercised to execute or not execute the operation upon checking, on the side of the mobile station, whether the request was issued by an authorized base station. As a result, it can be so arranged that implementation of a communication service will not be obstructed wrongfully, and terminal information concerning a mobile station or personal information set by a user will not be used secretly, owing to a request from an unauthorized network device.

Further, in accordance with the present invention, control for executing an operation can be carried out on the side of a mobile station upon distinguishing between a request requiring authentication as to whether a base station that issued the request is an authorized base station, and a request not requiring such authentication.

What is claimed is:

1. A mobile terminal in a mobile communication system for authenticating a communicating party when communication is performed between the mobile terminal and a device on the side of a network, comprising:
    authentication processing means which, when a request signal requesting operation execution is received from a network device, is for executing authentication processing to check whether said request signal is a request signal from an authorized network device; and
    operation execution means for executing an operation that is in accordance with said request signal if authentication that the network device is an authorized network device is obtained, wherein said authentication processing means includes:
        an authentication necessity table that indicates whether each request received from the network device requires authentication;
        means for storing an identifier and key information of a mobile terminal;
        a random-number generator for generating any random number when said request signal is received from the network device;
        an authentication operation unit for executing a prescribed authentication operation using said key information and random number;
        an authentication request signal transmitter for creating an authentication request signal, which includes said terminal identifier and random number, and sending this signal to the network device;
        a receiver for receiving an authentication result, which has been obtained by an authentication operation performed on the network side, from the network device; and
        a comparator for comparing the authentication result computed by the mobile terminal and the authentication result sent from the network device and deciding that the network device is an authorized network when the compared results agree, wherein
    said authentication processing means refers to said table when said request is received from the network device, and executes authentication processing if the received request is one requiring authentication, and said operation execution means executes the operation that is in accordance with said request signal if authentication that the network device is an authorized network device is obtained,
    said authentication processing means foregoes authentication processing if a request is not one requiring authentication, and said operation execution means executes the operation that is in accordance with said request signal, and
    said request signal is: a signal requesting that radio wave emissions be inhibited, a signal requesting that inhibition of radio wave emissions be canceled, a signal requesting that the mobile terminal make a transition to power cut-off, to a standby operation, and a signal requesting disclosure of mobile terminal information possessed by the mobile terminal.

2. A mobile communication system for authenticating a communicating party when communication is performed between a mobile terminal and a device on the side of a network, wherein
    the mobile terminal includes:
        authentication processing means which, when a signal requesting execution of a prescribed operation has been received from a network device, is for sending an authentication request signal to the network device in order to determine whether said request signal is a request signal from an authorized network device; performing an authentication operation; and comparing result of this authentication operation with result of an authentication operation sent from the network device; and
        operation execution means for executing an operation that is in accordance with said request signal if authentication that the network device is an authorized network device is obtained; and
    said network device includes an authentication operation unit for executing an authentication operation based upon an authentication request signal received from said mobile terminal, and sending result of this authentication operation to the mobile terminal, wherein the authentication processing means of said mobile terminal includes:
        an authentication necessity table that indicates whether each request received from the network device requires authentication;
        means for storing an identifier and key information of a mobile terminal;
        a random-number generator for generating any random number when said request signal is received from the network device;

an authentication operation unit for executing a prescribed authentication operation using said key information and random number;

an authentication request signal transmitter for creating an authentication request signal, which includes said terminal identifier and random number, and sending this signal to the network device;

a receiver for receiving result of an authentication operation obtained by an authentication operation of the network device; and a comparator for comparing result of the authentication operation performed by the mobile terminal and the result of the authentication operation sent from the network device and deciding that the network device is an authorized network device when the compared results agree, wherein said authentication processing means refers to said table when said request is received from the network device and executes authentication processing if the received request is one requiring authentication, and said operation execution means executes the operation that is in accordance with said request signal if authentication that the network device is an authorized network device is obtained, said authentication processing means foregoes authentication processing if a request is not one requiring authentication, and said operation execution means executes the operation that is in accordance with said request signal, and said request signal is: a signal requesting that radio wave emissions be inhibited, a signal requesting that inhibition of radio wave emissions be canceled, a signal requesting that the mobile terminal make a transition to power cut-off, to a standby operation, and a signal requesting disclosure of mobile terminal information possessed by the mobile terminal.

* * * * *